(12) United States Patent
Thomas et al.

(10) Patent No.: US 9,578,142 B2
(45) Date of Patent: Feb. 21, 2017

(54) SYSTEM AND METHOD FOR IMPROVING RESILIENCE IN TRANSMISSION OF DATA FRAGMENTS

(71) Applicant: CISCO TECHNOLOGY, INC., San Jose, CA (US)

(72) Inventors: Paul Bright Thomas, Wokingham (GB); Thomas Davies, Guildford (GB); Mohamed Kamel Zanaty, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 14/250,157

(22) Filed: Apr. 10, 2014

(65) Prior Publication Data
US 2015/0003474 A1 Jan. 1, 2015

Related U.S. Application Data

(60) Provisional application No. 61/841,762, filed on Jul. 1, 2013.

(51) Int. Cl.
*H04J 3/24* (2006.01)
*H04L 29/06* (2006.01)

(52) U.S. Cl.
CPC ................... *H04L 69/22* (2013.01)

(58) Field of Classification Search
CPC ........................................................ H04L 69/22
USPC ............................................................ 370/474
See application file for complete search history.

(56) References Cited

U.S. PATENT DOCUMENTS 6,608,933 B1* 8/2003 Dowell ................... G06T 9/007
382/232
7,245,615 B1* 7/2007 Potter ..................... H04L 69/16
370/386

OTHER PUBLICATIONS

Schierl et al., RTP Payload Format for High Efficiency Video Coding, Jun. 11, 2013, draft-schierl-payload-rtp-h265-03.txt.
Wang et al., RTP Payload Format for H. 264 Video, May 2011, Internet Engineering Task Force (IETF), 2011.

* cited by examiner

*Primary Examiner* — Shripal Khajuria
(74) *Attorney, Agent, or Firm* — Lempia Summerfield Katz LLC

(57) ABSTRACT

A system and method packetizes data by fragmenting, with processing circuitry, a data structure into a plurality of data fragments, each data fragment being included in a separate packet, and inserting, with processing circuitry, an offset indicator within each of the packets, each offset indicator indicating an amount of fragment data encapsulated within preceding packets. A system and method decodes packetized data that includes the offset indicator.

11 Claims, 13 Drawing Sheets

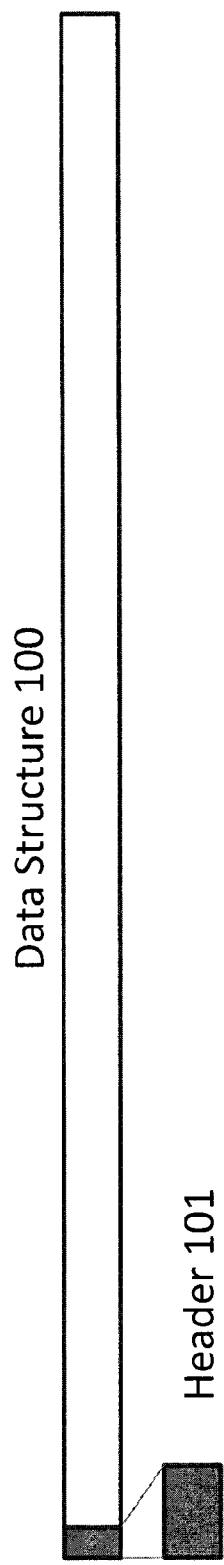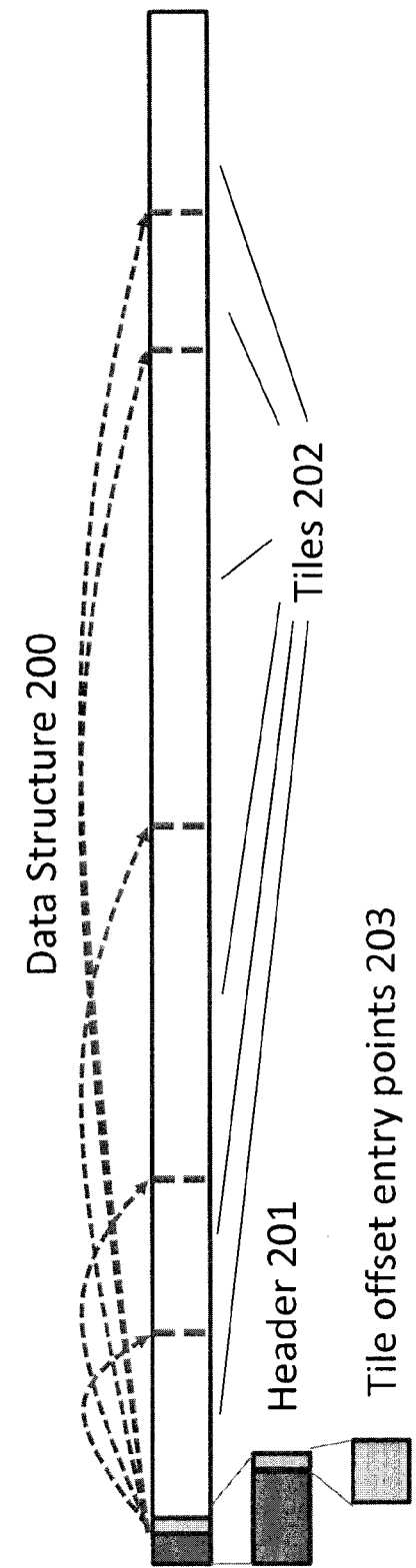

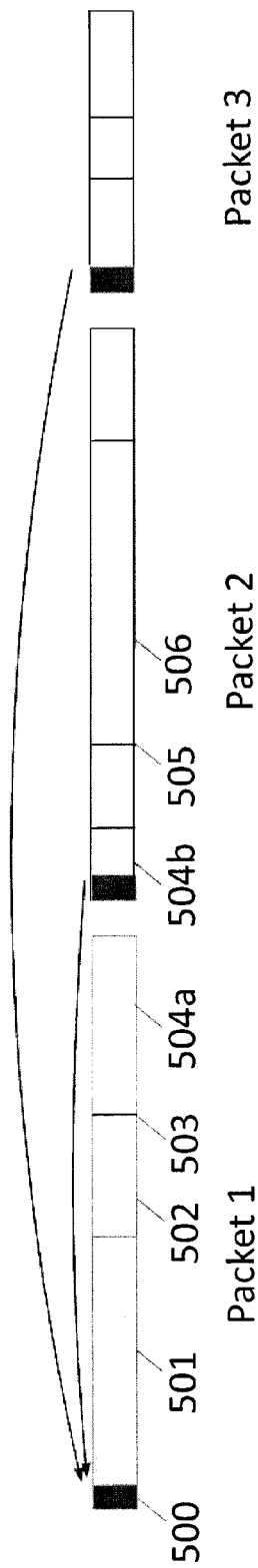
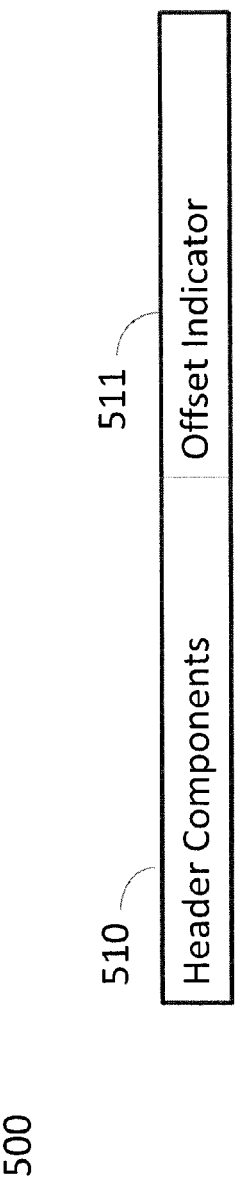
FIG. 2A
FIG. 2B

SYSTEM AND METHOD FOR IMPROVING RESILIENCE IN TRANSMISSION OF DATA FRAGMENTS

CROSS-REFERENCE TO RELATED APPLICATION

The present application claims the benefit of the earlier filing date of U.S. Provisional Application No. 61/841,762, filed Jul. 1, 2013, having common inventorship and ownership.

TECHNICAL FIELD

This application relates generally to packetization of encoded data and the decoding of packetized data transmitted over a packet-based network.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Transmission of data, such as video data, is typically performed by dividing the data into a plurality of packets that are reassembled upon receipt. However, loss of packets during transmission typically inhibits reassembly and use of data included in packets received from the point of loss onwards.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A illustrates an exemplary data structure including a header.

FIG. 1B illustrates an exemplary data structure divided into tiles.

FIG. 2A illustrates a schematic diagram showing how a packet header of a lead packet contains an offset indicator, which indicates an offset of a packetized data fragments.

FIG. 2B illustrates a packet header including an offset indicator.

DESCRIPTION OF EXAMPLE EMBODIMENTS

Overview

Figure 1C:
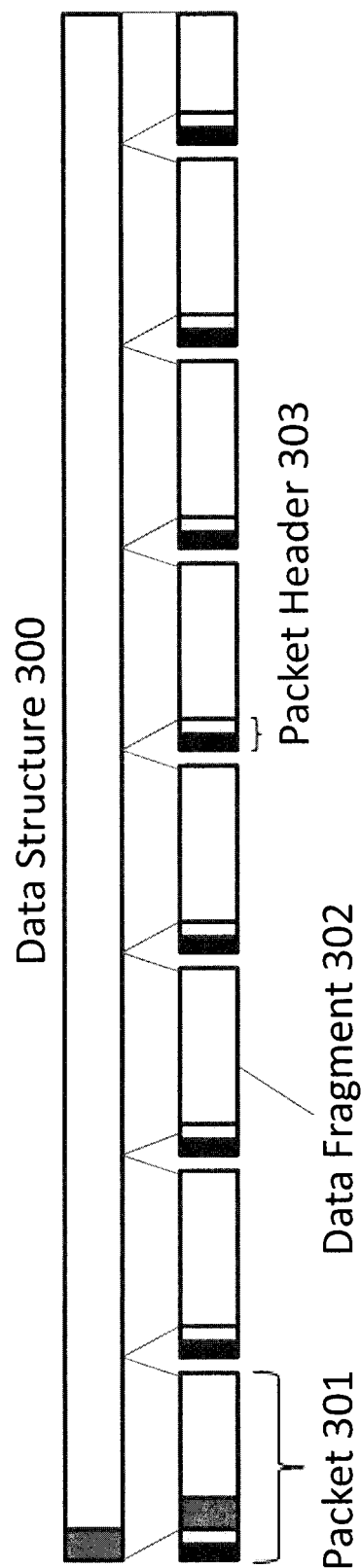
FIG. 1C illustrates exemplary packetized data fragments and packet headers.

In one exemplary embodiment, a method of packetizing data includes fragmenting, with processing circuitry, a data structure into a plurality of data fragments, each data fragment being included in a separate packet, and inserting, with processing circuitry, an offset indicator within each of the packets, each offset indicator indicating an amount of fragment data encapsulated within preceding packets.

In another exemplary embodiment, a method of decoding packetized data includes receiving, with processing circuitry, a plurality of packets, each packet of the plurality of packets including a data fragment of a data structure, and each packet of the plurality of packets including an offset indicator that indicates an amount of fragment data encapsulated within preceding packets, reassembling, with processing circuitry, the data fragments of the received packets into a reassembled data structure, and decoding, with processing circuitry, the reassembled data structure based on the offset indicators of the received packets.

Detailed Description of Example Embodiments

In the drawings, like reference numerals designate identical or corresponding parts throughout the several views. Further, as used herein, the words "a," "an" and the like generally carry a meaning of "one or more," unless stated otherwise.

Aspects of this disclosure relate to methods for packetizing data and decoding packetized data. However, the teachings of this disclosure are not limited to such systems.

Turning to the drawings, a video encoder is implemented by dividing each frame of video data into blocks of pixels. In existing standards for video compression (e.g., MPEG1, MPEG2, H.261, H.263, and H.264) these blocks may be of size 16×16 and may be referred to as macroblocks (MB). In high efficiency video coding (HEVC)/H.265, principal blocks may being referred to as "coding units," which are of a variable size. Typically, coding units may be larger than macroblocks, e.g. up to 64×64 pixels, and may be adaptively composed of a hierarchy of smaller coding units.

An encoding process operates over a contiguous set of coding units within a defined frame or sub-frame and produces coded data describing the compressed frame or sub-frame, which must be preceded by parameters describing the details of the coding. These data are known as a "slice segment" and the preceding parameters form a "slice segment header". FIG. 1A illustrates an exemplary data structure 100 including header 101. In an exemplary implementation, data structure 100 may comprise a slice segment, which in HEVC/H.265 is defined as a number of consecutive blocks in raster scan order. Data structure 100 may include at least one slice segment, and each data structure 100 begins with header 100. Further, data structure 100 may include part or all of a frame of image data.

Header 101 includes parameters that describe the encoding modes and parameters of the data included within data structure 100. Header 101 may also include reference to previously received parameter sets at the sequence and picture level.

An important aspect of encoding data is to allow transportation of compressed data, such as video data, over packet-based networks. In an exemplary implementation, a single slice segment including compressed video data is transported as one packet. Alternatively, a slice segment may cover a larger part or the whole of a coded frame, and be fragmented into a plurality of data structures 100 for individual transmission; this strategy reduces the overhead of having multiple slice segment headers within a coded frame. However, the transmission of separate data structures 100 may lead to data loss during transmission, and if the fragmentation process does not support the use of fragments received following a lost fragment, the impact of loss is amplified.

To ensure resilience to data loss, each data structure 100 may be configured to be independently decodable. That is, each data structure 100 may be configured to be an independent segment of data that is decodable by itself. In other words, the decoding of each data structure is not dependent upon reception of other data structures 100. As recognized by the present inventors, this requirement implies that all dependencies between data structures 100 are broken.

To allow for parallel processing of data structure 100, data structure 100 may be divided into tiles. In particular, FIG. 1B illustrates an exemplary data structure divided into tiles.

Data structure 200 includes header 201 and a plurality of tiles 202. Tiles 202 allow for data structure 200 to be divided up into a grid of rectangular regions that may be independently encoded or independently decoded, such as in HEVC/H.265. Tiles 202 inhibit the two-dimensional prediction dependencies between blocks in neighboring tiles while also supporting the exploitation of multiple processors, when available, to simultaneously perform encoding operations on multiple tiles. Partitioning a picture into tiles may be regular, in which case it is completely specified by numbers N and M of rows and columns of tiles. Partitioning may also be irregular, in which case the widths of each of the tile columns and the heights of each of the tile rows may be variable. In one embodiment, the spacing of each tile 202 may be fixed, variable, and/or configurable.

Data structure 200 may contain multiple tiles 202. To decode tiles 202, header 201 of data structure 200 includes tile offset entry points 203. Tile offset entry points 203 is a list of offsets to the data specific to tiles 202 encoded within data structure 200. That is, tile offset entry points 203 is information indicating an amount of data within data structure 200 that precedes each tile 202. In other words, tile offset entry points 203 lists an entry point in data structure 200 for each tile 202. With tile offset entry points 203, each tile 202 may be accessed and decoded independently, or in parallel, of other tiles 202 in data structure 200.

To allow network transportation, data structures may undergo fragmentation. Fragmentation is a process by which a data structure is divided up into a plurality of data fragments and mapped to multiple network packets in a way that allows the sequential transportation of the data fragments. Upon receipt, the data fragments may be reassembled into the whole data structure. Using conventional fragmentation, the reassembly of data fragments is a sequential process, and is terminated by the first missing fragment, since there is no way of relating subsequent fragments to their respective positions within the data structure.

FIG. 1C illustrates exemplary packetized data fragments and packet headers. In particular, FIG. 1C illustrates data structure 300 that is fragmented into a plurality of data fragments 302. Each data fragment 302 is included within a packet 301. In exemplary implementations, data structure 300 is fragmented into data fragments 302 in a sequential order and packets 301 are transmitted in the sequential order. Alternatively, data structure 300 is fragmented into data fragments 302 in another order and packets 301 are transmitted in the other order, such as a packet order. Each packet 301 includes a packet header 303 that includes, for example, a packet identifier or timestamp.

Each data fragment 302 of the plurality of data fragments may be of uniform size. Alternatively, data fragments 302 may vary in size. In an exemplary implementation, each data fragment 302 of the plurality of data fragments except for the last data fragment 302 may be of a same, fixed size. In another implementation, the size of each data fragment 302 may be configurable. In yet another implementation, each packet 301 may include a data fragment 302 of a minimum size.

In conventional decoding processes, loss of a single data fragments inhibits decoding of any data within the data structure from that point onwards in the sequence of data fragments. For transport of AVC/H.264 video, the Real-time Transport Protocol (RTP) defines a fragmentation process (RFC6184). In other words, conventional decoding processes cannot decode data fragments 302 that come after the lost data fragment 302 within the sequence of data fragments.

Methods in accordance with the present disclosure include modifying the packetization and reassembly of data to further increase resilience to packet loss. In particular, methods in accordance with the present disclosure provide additional resilience to packet loss when applied to packetization of video sequences coded using HEVC/H.265.

Figure 1E:
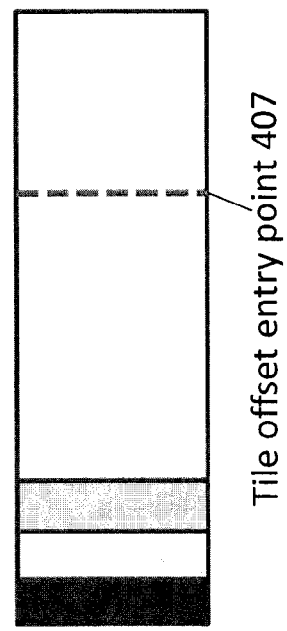
FIG. 1E illustrates a packet including a tile offset entry point.
Figure 1D:
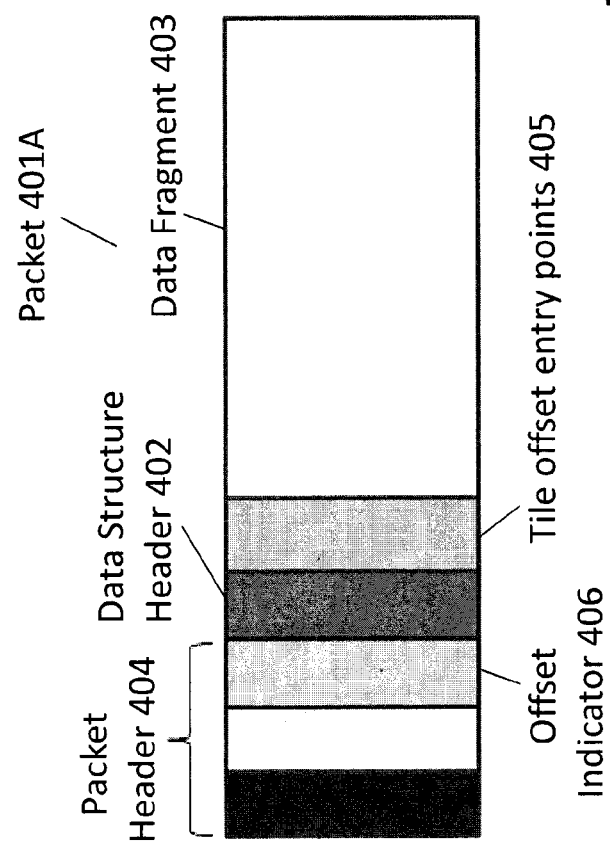
FIG. 1D illustrates an exemplary first packet of a data structure.
Figure 1F:
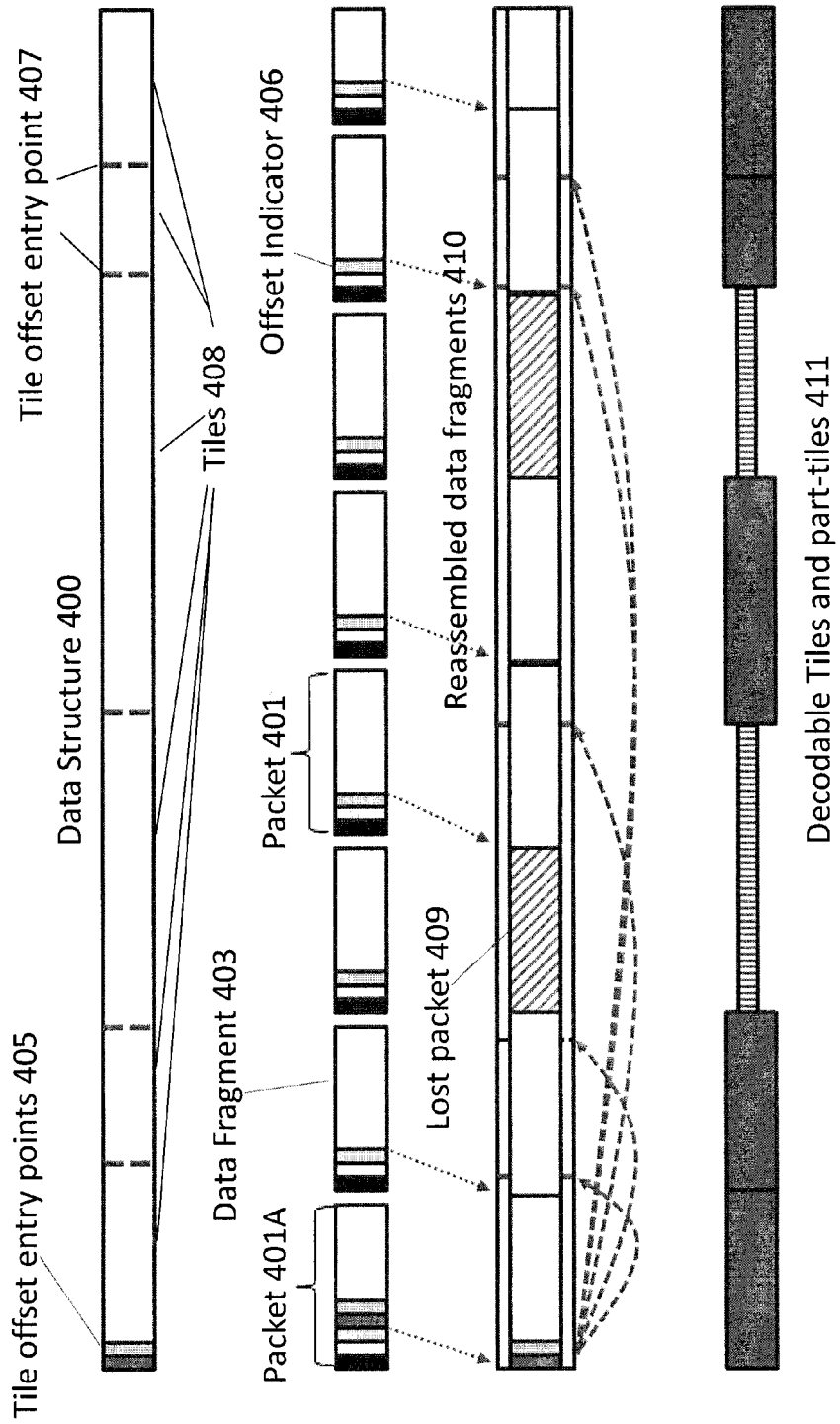
FIG. 1F illustrates reassembling packetized data fragments including and decoding tiles according based on offset indicators.

Discussion will now proceed to FIGS. 1D-1F. In particular, FIG. 1D illustrates an exemplary first packet in a data structure. FIG. 1E illustrates a packet including a tile offset entry point. FIG. 1F illustrates packetized data fragments including and decoding tiles. FIG. 1F further illustrates the reassembly of received data fragments and the decoding of tiles included in the received data fragments.

As illustrated in FIGS. 1D-1F, data structure 400 is divided into tiles 408. Tile offset entry points 405 are included in a header of data structure 400. As illustrated in FIG. 1D, tile offset entry points 405 are included within data structure header 402 of the first packet in data structure 400, packet 401A. Tile offset entry points 405 includes information relating to positions within data structure 400 of each individual tile offset entry point 407. Tile offset entry points 407 signify a beginning of each individual tile 408 within data structure 400.

Data structure 400 is further fragmented into a plurality of data fragments 403. Each packet 401 includes a separate data fragment 403. Each packet 401, including first packet 401A, further includes offset indicator 406. Offset indicator 406 may be included within packet header 404 of packet 401. For example, offset indicator 406 is included in packet header 404 of packet 401 of data structure 400.

In an exemplary implementation, offset indicator 406 includes information that indicates an amount of fragment data within data structure 400 that has been encapsulated within preceding packets. In other words, offset indicator 406 included in an individual packet includes data describing an amount of data included in the data structure prior to the fragment data of that individual packet.

For example, an offset indicator 406 included within a third packet 401 indicates an amount of fragment data, for example a number of bits or bytes, included in a first packet and a second packet that have been packetized before the third packet. However, an offset indicator 406 included within the second packet 401 only indicates an amount of fragment data included in the first packet and does not include an amount of fragment data included in the third packet because the third packet is packetized after the second packet.

In exemplary implementations, each packet 401 may be an RTP payload packet and a header included in each packet 401 is an RTP payload packet header. In such an implementation, offset indicator 406 is included within the RTP payload packet header.

After transmission of the plurality of packets 401, the packets are received at a destination. FIG. 1F further illustrates reassembly of the received packets. As may occur during transmission of packets, packets may be lost. Lost packet 409 is an exemplary illustration of a packet that is not received by the destination.

In exemplary implementations, packet headers 404 and offset indicators 406 for each packet 401 are removed and data fragments 403 are reassembled. Reassembled data fragments 410 are a reassembly of packets 401 that are received at a destination. Additionally, tile offset entry points 405 may be remapped upon reassembled data fragments 410.

In conventional decoding processes, when a data fragment is lost because a lost packet is not received, all subsequent data fragments of the same data structure must be discarded since there is no reliable mechanism to recover decoding context. This is because tile offset entry points indicate an amount of data within a data structure that precedes each tile. When packets are lost, a decoding apparatus does not possess enough information to properly decode the tile offset entry points because the data fragment that precedes a tile to be decoded was not received, and that which was received consequently has no explicit context within the slice segment.

Offset indicators 406 provide a reliable mechanism to recover decoding context when a packet is not received. In particular, offset indicators 406 provide a decoding device with information to determine an amount of fragment data that precedes a particular data fragment to be decoded. In combination with tile offset entry points 405, offset indicators 406 allow a decoding device to determine an amount of tile data that precedes a particular tile to be decoded.

In other words, offset indicators 406 may be used to reconstruct a map of parts of data structure 400 that are successfully received compared to parts of data structure 400 that are lost. Such information may be used for the decoding of tiles 408, as in FIG. 1F. In particular, FIG. 1F illustrates decodable tiles and part-tiles 411 that may be decoded by utilizing offset indicators 406 and tile offset entry points 405. In exemplary configurations, decodable part-tiles 411 may be decoded. Even though some decodable tiles and part-tiles 411 are after a lost packet in a steam of packets of data structure 400, those decodable tiles and part-tiles 411 may be recovered and decoded.

In an alternative implementation, an offset indicator for a lost packet may be provided by an external source, for example, by signaling or the utilization of SEI units. The offset indicator may also be carried in RTP header extensions, RTCP messages that give the offsets for all RTP sequence numbers, or SEI messages that give the offsets for all RTP sequence numbers, for example corresponding to a frame or set of frames.

In other implementations, methods for secure delivery of packets may be implemented. For example, protection using forward error correction (FEC) or other means for the first packet, or whichever packet(s) contain tile offset entry points will improve decoding efficiency. The cost of protection may be reduced by applying such protection methods preferentially to those fragments of highest priority, such as those fragments containing data structure headers. Similarly, differential protection using FEC or other approaches for packets containing data relating to specific areas of a picture may be utilized.

Discussion will proceed to FIGS. 2A and 2B. FIG. 2A illustrates a schematic diagram showing how a packet header of a lead packet contains an offset indicator, which indicates an offset of a packetized data fragments. FIG. 2B illustrates packet header 500 including an offset indicator.

In particular, FIG. 2A illustrates a plurality of packets including data fragmented from a data structure. Packet 1 includes packet header 500. As illustrated in FIG. 2B, packet header 500 may include header components 510 and offset indicator 511. Packet 1 further data structure header 501 and data fragment 502.

In exemplary implementations, the data structure may be further divided into one or more tiles. In such implementations, packet 1 further includes tile offset entry point 503. Information relating to the tile offset entry points is included within data structure header 501, as previously described regarding FIGS. 1D-1F.

Individual tiles may be divided between packets. For example, a first portion of tile 504 is illustrated as field 504*a*, and a second part of tile is included 504 is illustrated as field 504*b*. That is, field 504*a* of tile 504 is within packet 1, while field 504*b* of tile 504 is within packet 2. Next tile 506 is then included in Packet 2, as identified by tile offset entry point 505.

Figure 3:
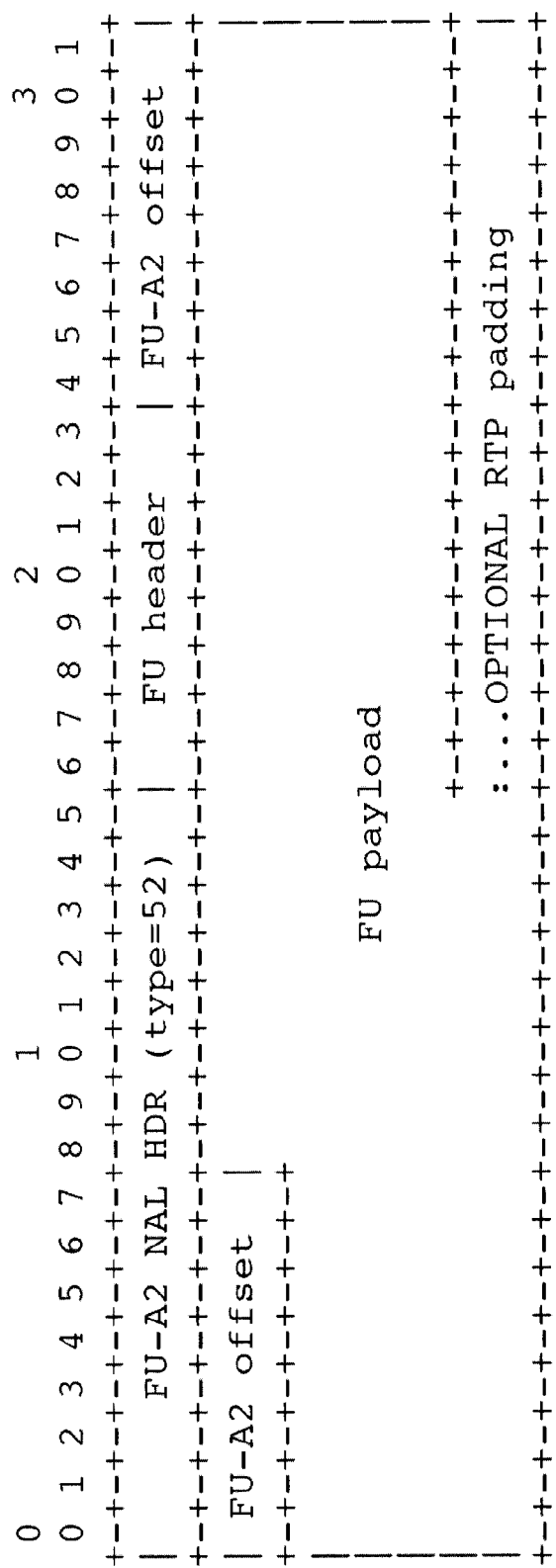
FIG. 3 is a schematic diagram illustrating an exemplary packet including offset indicators that indicates a fragment offset to the data fragment carried within a transmission packet.

FIG. 3 is a schematic diagram illustrating an exemplary packet including offset indicators that indicates a fragment offset to the data fragment carried within a transmission packet. In particular, FIG. 3 illustrates a first packet, referred to as first fragmentation unit, or FU-A2. FU-A2 further includes: a data fragment labeled FU payload; a packet header labeled FU header; a data fragment header labeled network abstraction layer header (NAL HDR); and offset indicators. In particular, FU-A2 may include one or more offset indicators labeled FU-A2 offset.

FU-A2 offset can be used for random access to any tile for parallel processing, region of interest extraction, and resilience to errors in other tiles. In reference to FIG. 3, these offsets can also be used to provide resilience to packet loss, in conjunction with fragment offsets included in FU-A2.

Figure 4:
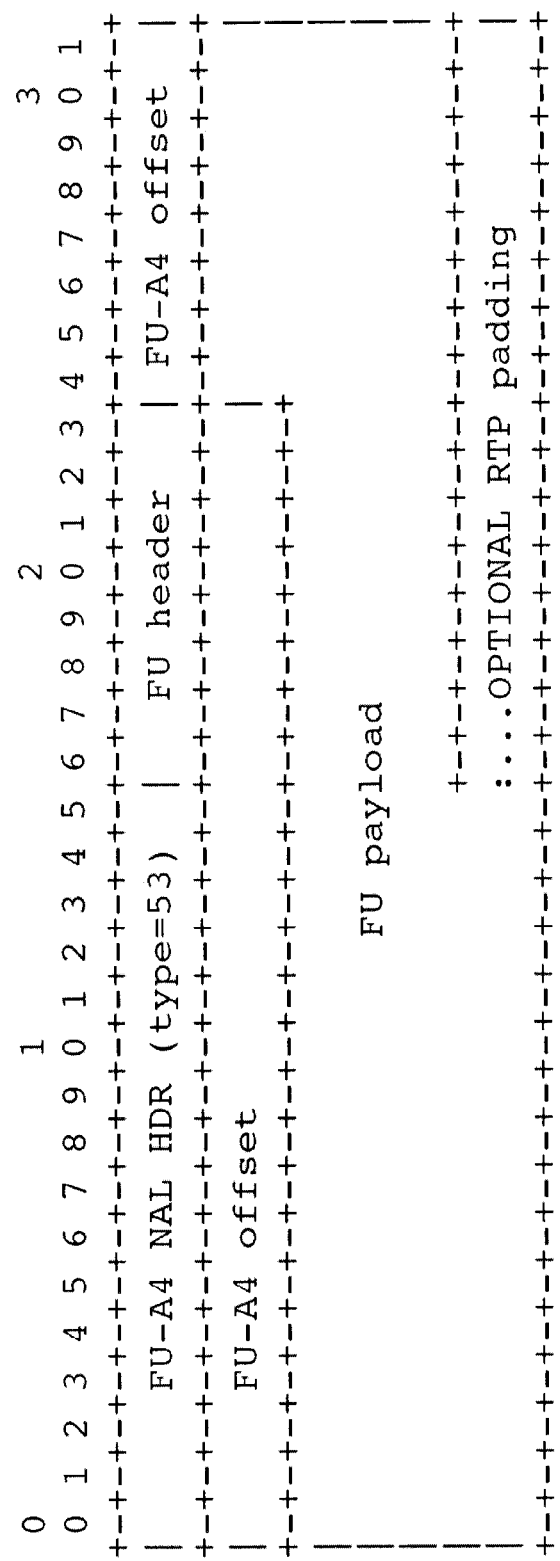
FIG. 4 is a schematic diagram showing offset indicators of a different field size than those illustrated in FIG. 3.

FIG. 4 is a schematic diagram showing offset indicators of a different field size than those illustrated in FIG. 3. In particular, the offset indicator of packet FU-A4, FU-A4 offset, is of a different field size than the offset indicator of packet FU-A2 of FIG. 3.

Both fragmentation units FU-A2 and FU-A4 contain a fragment offset before the FU payload (data fragment). FU-A2 contains a 2-byte offset as illustrated in FIG. 3. FU-A4 contains a 4-byte offset as illustrated in FIG. 4. The offset indicators include a total number of bytes in all prior FU payloads of the fragmented data structure.

In exemplary implementations, a first packet in a fragmenting sequence of a fragmented data structure may include zero offset because there is no fragmented data preceding the packet in the sequence. As a result, the first packet may include a start bit (S) that indicates zero offset. Packets following the first packet may include 2-byte, 4-byte or other offset indicator configurations. In exemplary configurations, packets with non-zero offsets do not include a start bit (S).

Figure 5:
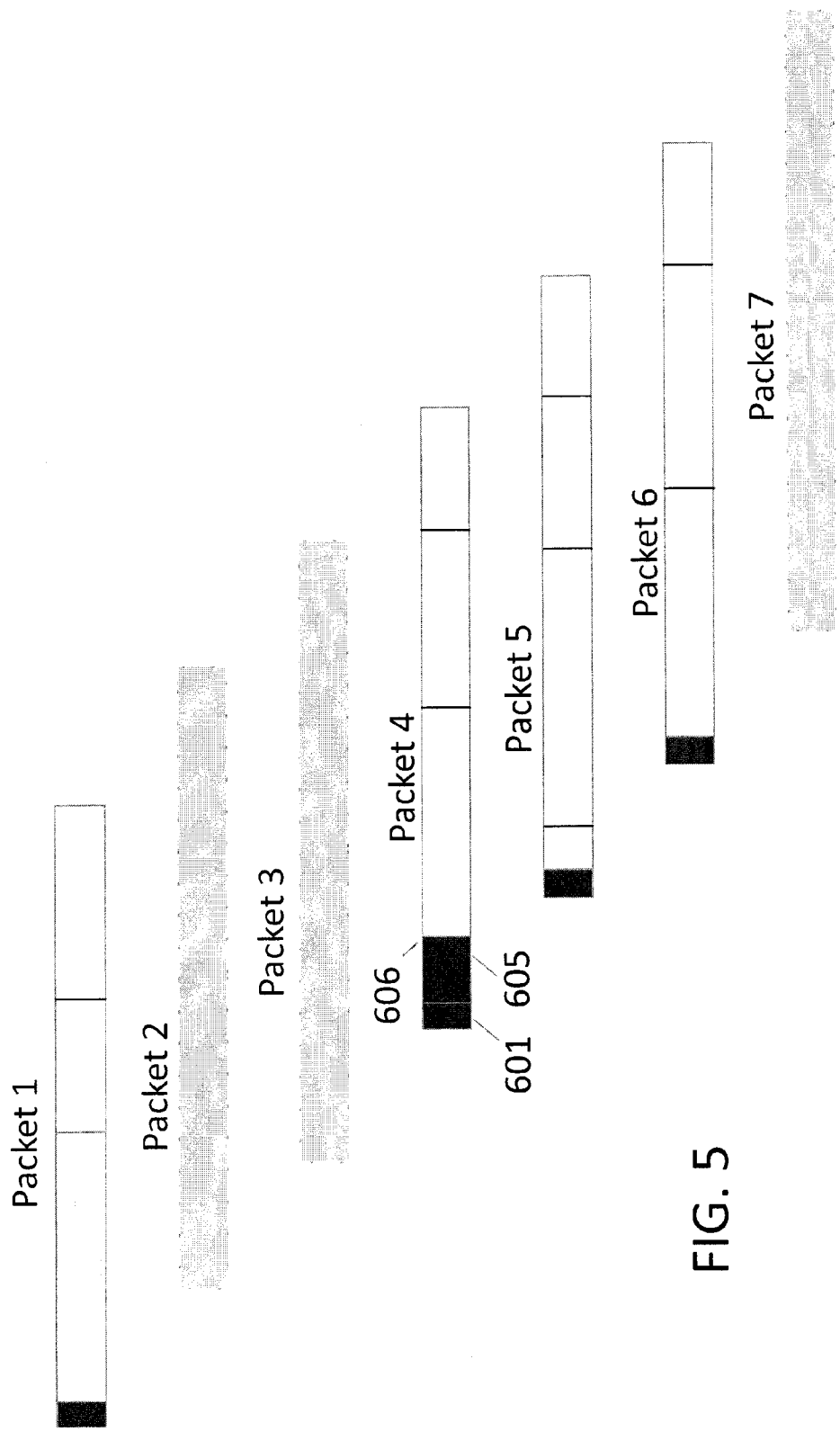
FIG. 5 illustrates an example of a transmission of packets in a packet stream that includes packets that are received and packets that are lost.

FIG. 5 illustrates an example of transmission of packets in a packet stream that includes packets that are received and packets that are lost. In particular, packets 2, 3 and 7 are lost packets. Packets 1 and 4-6 are received properly. Packet 1 includes a packet header and offset indicator, as well as a data structure header and tile offset entry points. In the example of FIG. 5, packet 2 and packet 3 are not received, and packet 4 is the next packet that is received.

Packet 4 includes header 601. Tile 605 cannot be decoded because the first part of tile 605 was lost when packet 3 was not received. However, tile offset entry point 606 indicates a next tile that may be decoded because tile offset entry point can be derived from the tile offset entry points conveyed in the data structure header of packet 1, along with the offset indicator. Additionally, the last partial tile conveyed in packet 6 is not decodable because the subsequent packet, packet 7, is lost.

Figure 6:
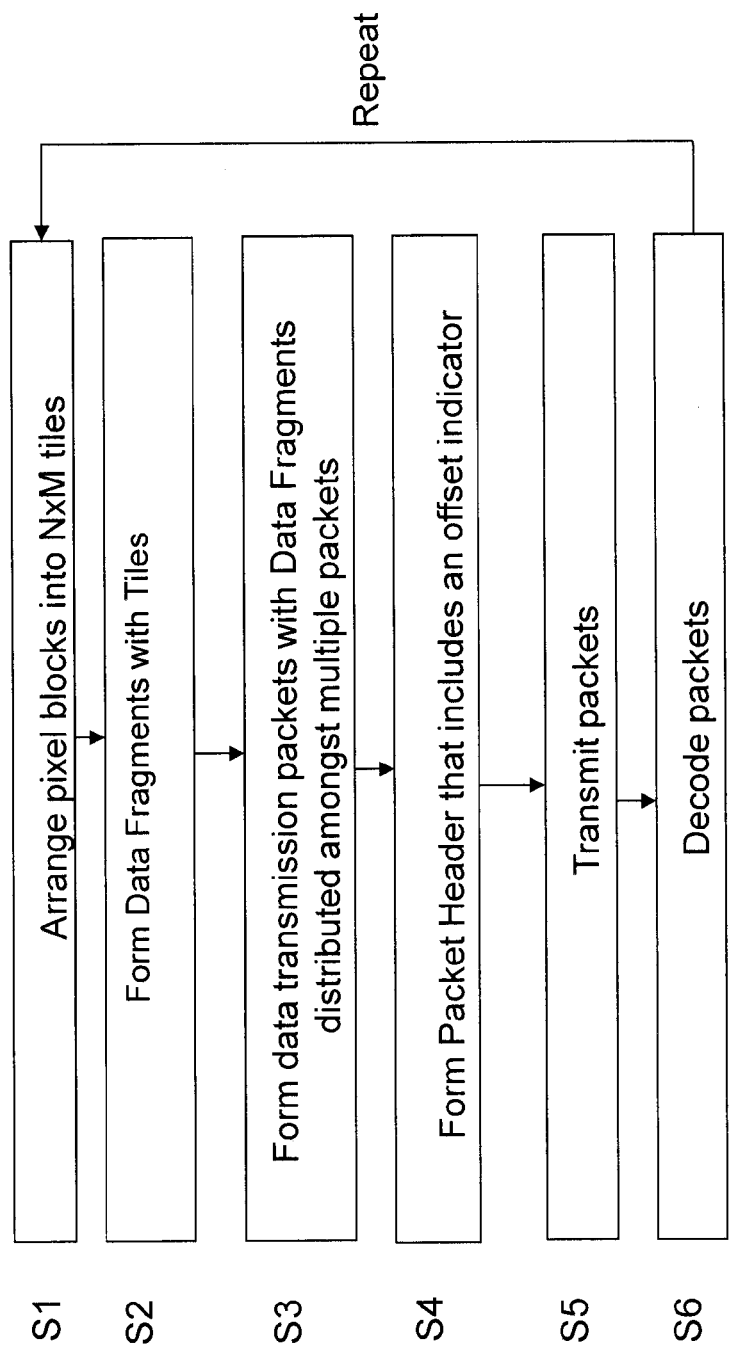
FIG. 6 illustrates an exemplary method for encoding and decoding tiles in transmission packets with fragment offsets included in transmission packet headers.

FIG. 6 illustrates an exemplary method for encoding and decoding tiles in transmission packets with fragment offsets included in transmission packet headers. In an exemplary implementation, the method illustrated in FIG. 6 is performed by a processor or processing circuitry.

The method begins at step S1, where a data structure is divided into tiles. In an exemplary implementation, pixels of a picture are arranged in tiles. The method proceeds to step S2, where, the processor (or processing circuitry) forms data fragments of the data structure. The tiles of the data structure are included in the data fragments. The method then proceeds to step S3, where packets are formed with the data fragments (and tiles distributed) amongst multiple packets.

In step S4, a packet header is formed for each packet. Each packet header is formed to include an offset indicator that includes information that indicates an amount of fragment data that has been encapsulated within preceding packets. The method proceeds to step S5, where the packets are transmitted. In exemplary implementations, the packets are transmitted in a packet stream or packet burst.

Finally, in step S6, the packets are decoded. To decode the packets, a decoding apparatus determines whether any packets are lost. Should the decoding apparatus determine that a packet is lost, the offset indicator is extracted and used with tile offset entry point information to identify a beginning of a next tile in a data fragment that was successfully received for decoding of the next tile. If no remaining tile offset exceeds the value of the offset indicator for the first fragment after loss, then no recovery of fragments following the loss is possible. The method may be repeated.

Figure 7:
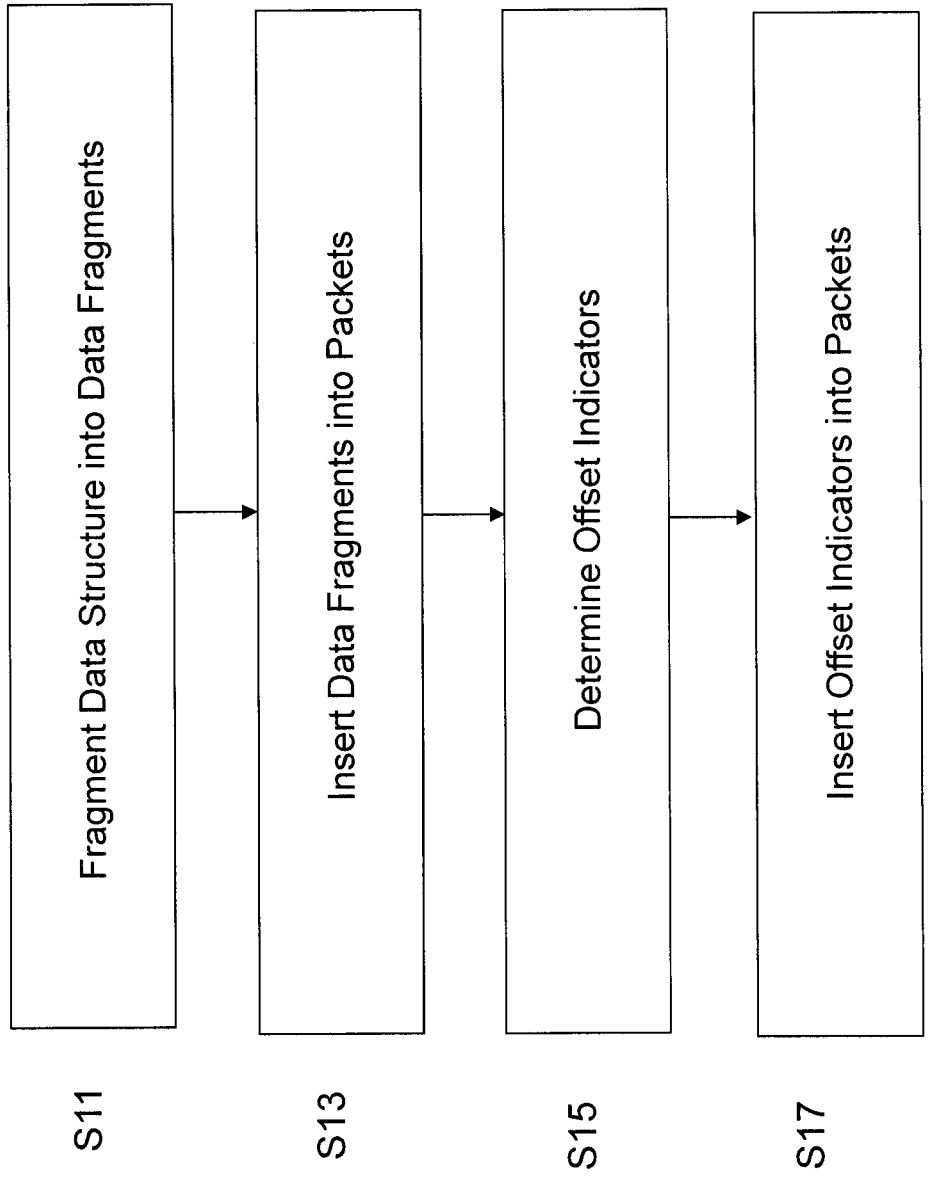
FIG. 7 illustrates an exemplary method of packetizing data.

FIG. 7 illustrates an exemplary method of packetizing data. In an exemplary implementation, the method illustrated in FIG. 7 is performed by a processor or processing circuitry.

The method illustrated in FIG. 7 begins in step S11, where a data structure is fragmented into data fragments. In exemplary implementations, the data structure may be further divided into tiles. Tile offset entry point information may be included in a data structure header.

In step S13, the data fragments are inserted into packets. In other words, the data fragments are individually packetized. The data structure header and the tile offset entry point information may be included within a first packet. Further, each packet includes, or is formed to include, a packet header.

In step S1, offset indicators for each packet are determined. In particular, the processor (or processing circuitry) determines an amount of data that has been encapsulated within preceding packets.

Finally, in step S17 the offset indicators are inserted into the packets. In exemplary implementations, the offset indicator for each packet is inserted into packet header.

Figure 8:
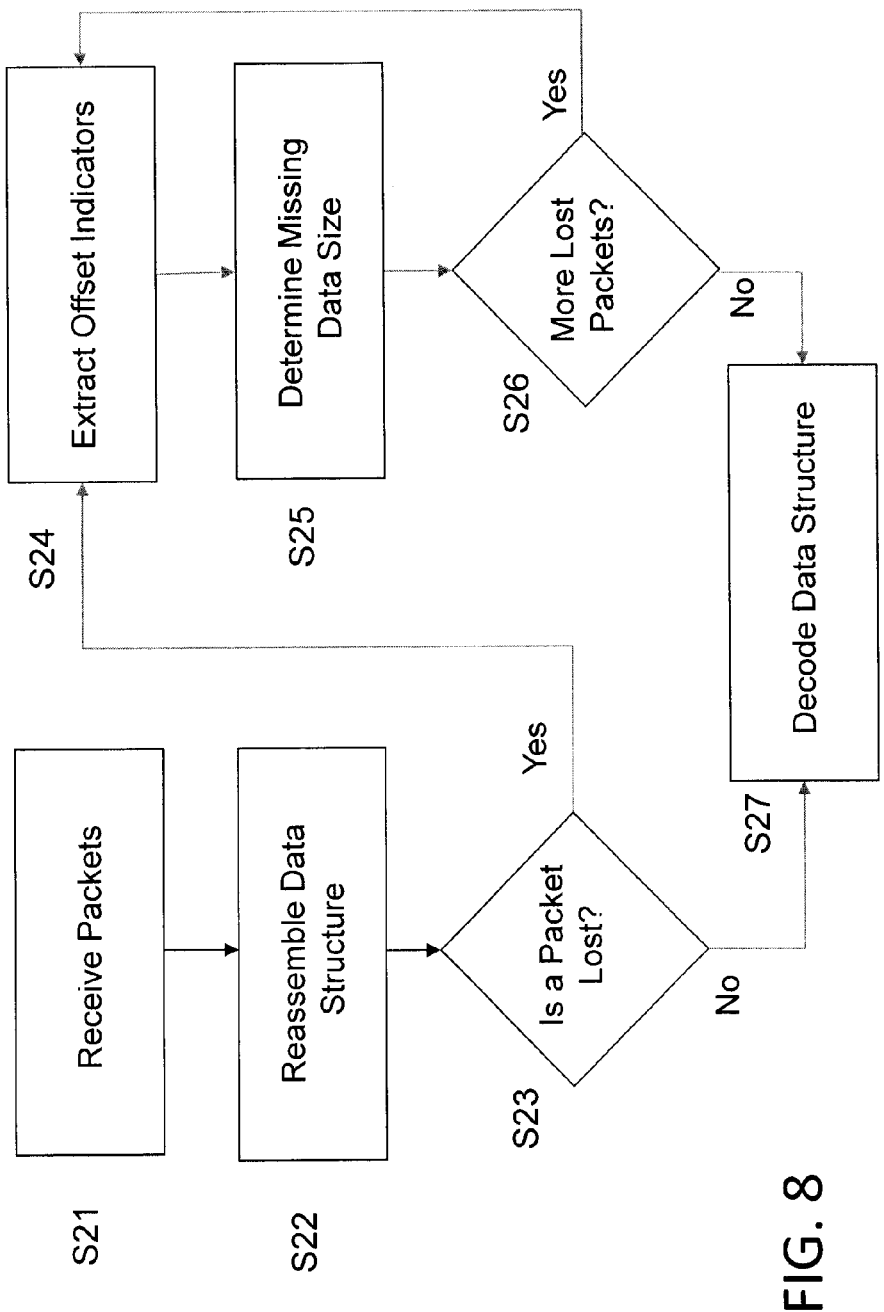
FIG. 8 illustrates an exemplary method of decoding packetized data.

FIG. 8 illustrates an exemplary method of decoding packetized data. In an exemplary implementation, the method illustrated in FIG. 8 is performed by a decoding apparatus including a processor or processing circuitry.

The method illustrated in FIG. 8 begins in step S21, where packets are received. In step S22, data fragments are extracted from the received packets and a data structure is reassembled. In step S23, the decoding apparatus determines whether a packet is lost. If all packets in the data structure were received, i.e., no packets were lost, the method proceeds to step S27. However, if the decoding apparatus determines that a packet was lost, the method proceeds to step S24.

In step S24, offset indicators are extracted from packets surrounding the lost packet. In particular, an offset indicator is extracted from a received packet that is directly before the lost packet. If a packet that is directly before the lost packet is not received and is also lost, then an offset indicator is extracted from a received packet that is closest in order to the lost packet and before the lost packet.

Also in step S24, an offset indicator is extracted from a received packet that is directly after the lost packet. If a packet that is directly after the lost packet is not received and is also lost, then an offset indicator is extracted from a received packet that is closest in order to the lost packet and after the lost packet. After the offset indicators are extracted from received packets surrounding the lost packet, the method proceeds to step S25.

In step S25, a missing data size is determined. In an exemplary implementation, the decoding apparatus determines a missing data size, $D_m$, by the following equation:

$$D_m = O_n - (O_p + D_p),$$

where $O_p$ is the offset indicator of the prior packet, $O_n$ is the offset indicator of the next packet, and $D_p$ is a data size of the prior packet. In other implementations, however, missing data size $D_m$ may be determined through some other equation or relationship.

The data size of the prior packet may be determined by the decoding apparatus. Alternatively, the data size of the prior packet may be included in the packet header of the prior packet.

Once the missing data size of the lost packet is determined, the method proceeds to step S26. In step S26, the decoding apparatus determines whether there is another packet that is lost. If all packets in the data structure were received, i.e., no packets were lost, the method proceeds to step S27. However, if the decoding apparatus determines that another packet was lost, the method returns to step S24.

Finally, in step S27, the decoding apparatus decodes the reassembled data structure including the received packets. Should a packet have been determined to be lost, the decoding apparatus decodes the data structure utilizing the missing data size of the lost packet, as determined in step S25.

In exemplary implementations, a message may be transmitted by the decoding apparatus to an encoding apparatus or another destination when the decoding apparatus determines that a packet is lost. Alternatively, the decoding apparatus may transmit a message periodically that lists a number of lost packets, the lost packet identifiers, or surrounding packets of packets determined to be lost.

In an exemplary implementation, the decoding apparatus may employ methods to conceal errors in decoding when packets are determined to be lost. Further, the decoding apparatus may employ behaviour to avoid dependence upon data fragments determined to be included in lost packets.

It is possible that, during transmission of a plurality of packets, a series of consecutive packets may be lost. Further, it is possible that the series of lost packets may span more than one data structure, when there is more than one data structure. In such a situation, the series of packets may include the loss of a packet that has the structure header for one of the data structures. In a case of two or more lost data fragments, consecutively received packets may contain data from different data structures. As a result, offset indicators in the later packets may be with respect to a start point of the next data structure that is not received. Thus, to successfully decode packets in such a situation, it is important to be able to determine when this has occurred.

Figure 9:
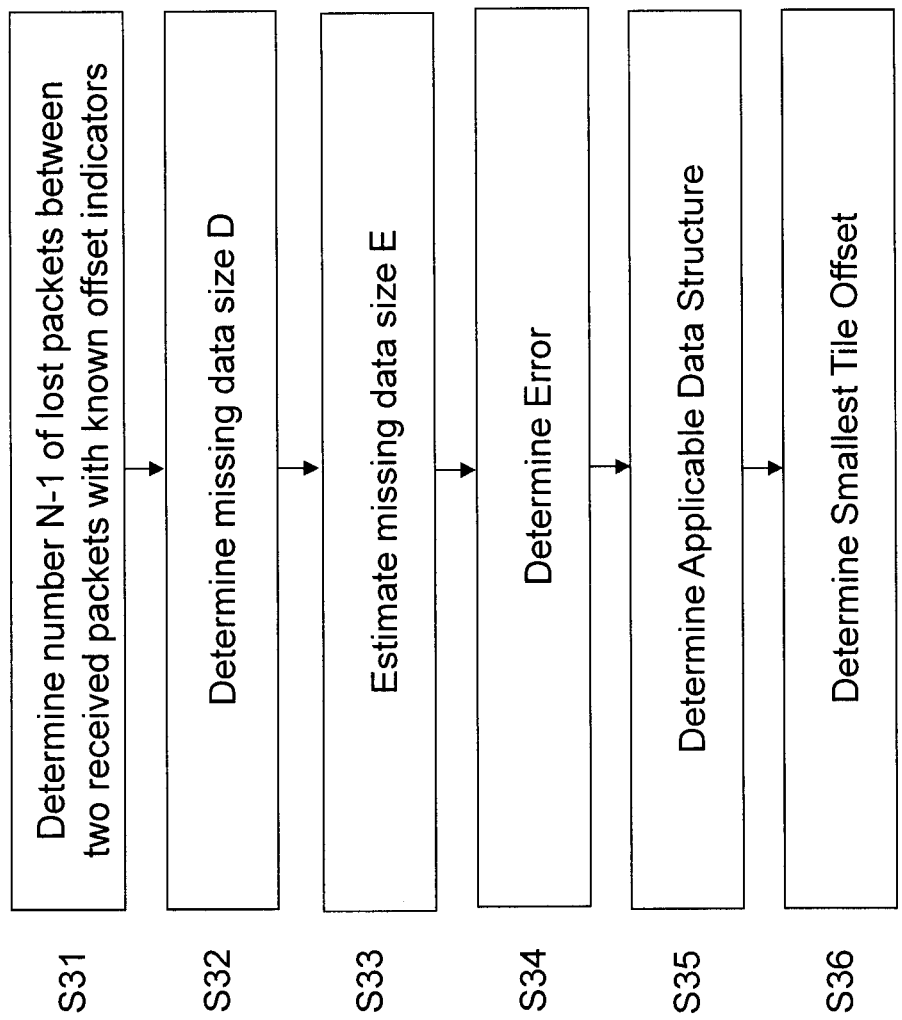
FIG. 9 illustrates an exemplary method for determining when lost data packets are part of a same data structure.

FIG. 9 illustrates an exemplary method for determining when lost data packets are part of a same data structure. In particular, the method illustrated in FIG. 9 may be applied to determine when data fragments within lost packets are all part of the same fragmented data structure as subsequently received data fragments with identical RTP timestamps and data structure header ID and temporal ID values.

In particular, the following method is used to resolve ambiguity between (i) continued fragmentation of a single data structure after loss of two or more packets and (ii) loss concealing an end of one data structure and the start of a next data structure. When the (ii) is confused with (ii), invalid offset indicator values will be applied during decoding of packets in the second data structure, resulting in failure to produce valid decoded data. By application of the method illustrated in FIG. 9, in conjunction with tile offset entry points, fragments following one or more lost fragments may be decoded.

For example, a method in accordance with FIG. 9 would assist in a scenario including 1-3:

1. A received data structure header for data structure k is contained in a packet with packet sequence number j. Within an existing RTP fragmentation scheme, as a packet including the first data fragment of the fragmented data structure k, the fragment containing the slice segment header for slice segment k must be marked as an initial fragmentation unit.

2. A series of zero or more received packets follows packet j, and the series is consecutive (as indicated by, for example, a packet sequence number), up to a packet with sequence number j+i. Packet j+i is not marked as a terminal packet including the last data fragment of the data fragment structure k, indicating there are further data fragments required to complete the data structure k.

3. The next RTP packet received after j+i is a non-initial packet with packet sequence number j+i+N (N>1). In an exemplary implementation, N is the offset of a next packet. When N=1, a number of lost packets is equal to 0, meaning that the number of lost packets is N−1. For example, when N=3 between a packet and a next packet, a number of lost packets is equal to 2, N−1 when N=3. Thus, it is unknown if this packet includes a data fragment that is a part of data structure k, or if the packet includes a data fragment that is a part of a subsequent data structure k+1, k+2, etc.

In an exemplary implementation, the method illustrated in FIG. 9 is performed by a processor or processing circuitry.

The method illustrated in FIG. 9 begins with step S31. In step S31, a number N−1 of missing packets between two received packets with known offset indicators is determined. In an exemplary implementation, N−1 may be determined by examining packet sequence number or packet identifiers included with packet headers.

In step S32, a size of the missing data is determined. For example, the size of the missing data may be determined as in step S25 of the method illustrated in FIG. 8. In particular, missing data size, $D_m$, may be determined by the following equation:

$$D_m = O_n - (O_p + D_p),$$

where $O_p$ is the offset indicator of the prior packet, $O_n$ is the offset indicator of the next packet, and $D_p$ is a data size of the prior packet. Op+Dp is the point in slice segment k at which the first lost packet began, and On−(Op+Dp) is the amount of lost data.

Relating step S33 to the scenario of 1-3 above, the missing data size may be equal to a difference between the offset indicators of packets j+i and j+i+N, minus $D_p$.

In step S33, an estimation of the missing data size E is calculated. In particular, E is calculated as follows: E=N×D. D is an average fragment size, and E is an estimate of the expected minimum data size of the lost packets carried by N−1 lost packets of a fragmented data structure k.

D may be assigned the value of $D_p$, but in situations where $D_p$ is atypically small, a representative fragment size $D_r$ may be substituted for $D_p$. For example, a representative fragment size $D_r$ may be utilized when the prior packet includes an initial fragment, which may be deliberately size-constrained in order to enable strong protection of the essential information it contains. In another exemplary implementation, data size D may be explicitly included in the packet header or the offset indicator of a packet of data structure k.

Where two fragments p and n, fragment p from a prior packet and fragment n from a next packet, belong to the same data structure, the two quantities $D_m$, determined from fragment offsets, and E, estimated from packet indexing, should be comparable. In step S34, an expression for determining the degree of consistency between these quantities is described.

In particular, in step S34 an ERROR is calculated as follows:

$$\text{ERROR} = \left| \frac{D_m - E}{D_m} \right|.$$

Finally, in step S35, an applicable data structure is determined for the lost packets. That is, in step S35 it is determined whether the lost packets include data fragments that are a part of data structure k or another data structure, such as data structure k+1. For example, if n is a non-terminal fragment, then it is determined that the lost packets are from a same data structure k.

In an exemplary implementation, step S35 is accomplished by analysing the ERROR calculated in step S34 and timestamps of the two received packets (the next packet and the prior packet).

For example, when ERROR is less than a threshold parameter and the two received packets have a same timestamp, it is determined that the data fragments for lost packets are part of the same data structure as the data fragments of the two received packets. Otherwise, when ERROR is not less than threshold parameter or the two received packets do not have a same timestamp, it is determined that the data fragments for lost packets are not part of the same data structure as the data fragments of the two received packets.

In an exemplary configuration, the threshold parameter may be 50%. In other configurations, the threshold parameter may be adjustable by a user. For successful discrimination between valid and invalid recovery, the threshold parameter should be substantially less than one.

Finally, in step S36, to resume the decoding of data from the next packet following loss, it is necessary to determine the smallest tile offset in the slice segment header for slice segment k which exceeds the fragment offset $O_n$. This tile entry point becomes a post-loss re-entry point for the slice segment k, and decoding of the received data within slice segment k continues from this point. If $O_n$ exceeds the largest tile offset in the slice header, then no further decoding of this slice segment k is possible.

Further, the method illustrated in FIG. 9 may be employed in the decoding of a data stream with a single data structure per picture/frame, using SDP, RTCP or SEI or another signaling scheme.

Figure 10:
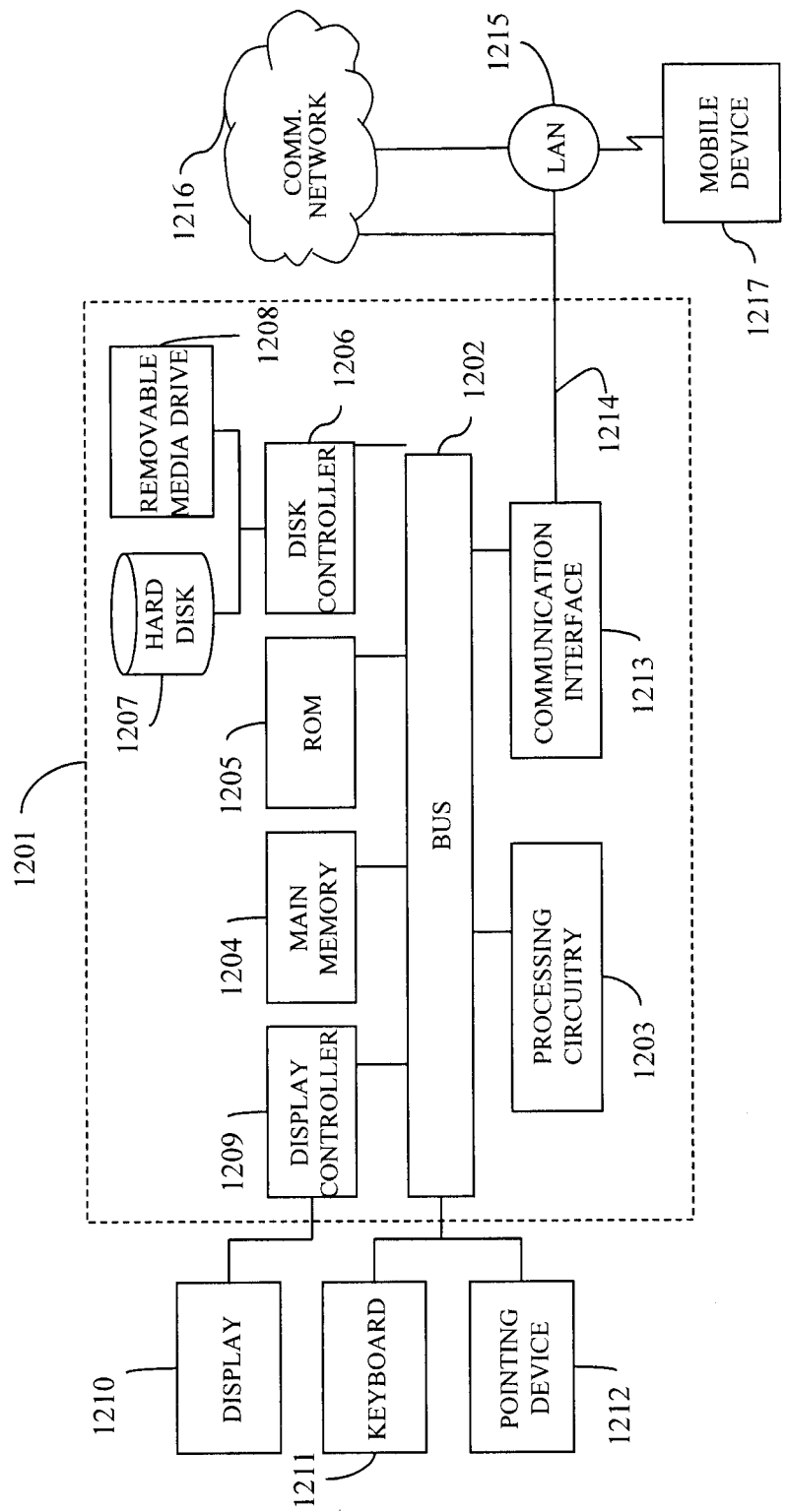
FIG. 10 illustrates an exemplary hardware configuration of a computer-based system including an encoder or decoder that performs methods for packetizing, encoding and decoding packetized data.

FIG. 10 illustrates an exemplary hardware configuration of a computer-based system including an encoder or decoder that performs methods for packetizing, encoding and decoding packetized data as described above.

FIG. 10 illustrates a computer system 1201 upon which an embodiment of the present invention may be implemented. The computer system 1201 may be programmed to implement a computer based video conferencing endpoint that includes a video encoder or decoder for processing real time video images. The computer system 1201 includes a bus 1202 or other communication mechanism for communicating information, and a processor (or processing circuitry) 1203 coupled with the bus 1202 for processing the information. While the FIG. 10 shows processing circuitry 1203, it should be understood that processing circuitry 1203 may include a plurality of processing cores, each of which can perform separate methods and processes for packetizing, encoding and decoding packetized data.

Computer system 1201 also includes a main memory 1204, such as a random access memory (RAM) or other dynamic storage device (e.g., dynamic RAM (DRAM), static RAM (SRAM), and synchronous DRAM (SDRAM)), coupled to bus 1202 for storing information and instructions to be executed by processing circuitry 1203. In addition, the main memory 1204 may be used for storing temporary variables or other intermediate information during the execution of instructions by processing circuitry 1203. The computer system 1201 further includes a read only memory (ROM) 1205 or other static storage device (e.g., programmable ROM (PROM), erasable PROM (EPROM), and electrically erasable PROM (EEPROM)) coupled to bus 1202 for storing static information and instructions for processing circuitry 1203.

Computer system 1201 also includes a disk controller 1206 coupled to bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to computer system 1201 using an appropriate device interface (e.g., small computer system interface (SCSI), integrated device electronics (IDE), enhanced-IDE (E-IDE), direct memory access (DMA), or ultra-DMA).

Computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computer system 1201 may also include a display controller 1209 coupled to bus 1202 to control a display 1210, such as a cathode ray tube (CRT), for displaying information to a computer user. The computer system includes input devices, such as a keyboard 1211 and a pointing device 1212, for interacting with a computer user and providing information to processing circuitry 1203. Pointing device 1212, for example, may be a mouse, a trackball, or a pointing stick for communicating direction information and command selections to processing circuitry 1203 and for controlling cursor movement on display 1210. In addition, a printer may provide printed listings of data stored and/or generated by computer system 1201.

Computer system 1201 performs a portion or all of the processing steps of the invention in response to processing circuitry 1203 executing one or more sequences of one or more instructions contained in a memory, such as main memory 1204. Such instructions may be read into main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling computer system 1201, for driving a device or devices for implementing the invention, and for enabling computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to processing circuitry 1203 for execution. A computer readable medium may take many forms, including but not limited to, non-volatile media, volatile media, and transmission media. Non-volatile media includes, for example, optical, magnetic disks, and magneto-optical disks, such as hard disk 1207 or the removable media drive 1208. Volatile media includes dynamic memory, such as the main memory 1204. Transmission media includes coaxial cables, copper wire and fiber optics, including the wires that make up bus 1202. Transmission media also may also take the form of acoustic or light waves, such as those generated during radio wave and infrared data communications.

Various forms of computer readable media may be involved in carrying out one or more sequences of one or more instructions to processing circuitry 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 1201 may receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1204, from which processing circuitry 1203 retrieves and executes the instructions. The instructions received by main memory 1204 may optionally be stored on storage device 1207 or 1208 either before or after execution by processing circuitry 1203.

The computer system 1201 also includes a communication interface 1213 coupled to bus 1202. Communication interface 1213 provides a two-way data communication coupling to a network link 1214 that is connected to, for example, a local area network (LAN) 1215, or to another communications network 1216 such as the Internet. For example, communication interface 1213 may be a network interface card to attach to any packet switched LAN. As another example, communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, communication interface 1213 sends and receives electrical, electromagnetic or optical signals that carry digital data streams representing various types of information.

Network link 1214 typically provides data communication through one or more networks to other data devices. For example, network link 1214 may provide a connection to another computer through a local network 1215 (e.g., a LAN) or through equipment operated by a service provider, which provides communication services through a communications network 1216. Local network 1214 and communications network 1216 use, for example, electrical, electromagnetic, or optical signals that carry digital data streams, and the associated physical layer (e.g., CAT 5 cable, coaxial cable, optical fiber, etc.). The signals through the various networks and the signals on network link 1214 and through communication interface 1213, which carry the digital data to and from computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. Computer system 1201 can transmit and receive data, including program code, through network(s) 1215 and 1216, network link 1214 and communication interface 1213. Moreover, network link 1214 may provide a connection through a LAN 1215 to a mobile device 1217 such as a personal digital assistant (PDA) laptop computer, or cellular telephone.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of decoding packetized data, the method comprising:
   receiving, with processing circuitry, a plurality of packets using real-time transport protocol, each packet of the plurality of packets including a data fragment of a data structure, and each packet of the plurality of packets including an offset indicator that indicates a number of bits or bytes of fragment data encapsulated within preceding packets;
   determining a fragment size for the data fragment for at least one of the received packets;
   extracting the offset indicators for the received packets;
   reassembling, with processing circuitry, the data fragments of the received packets into a reassembled data structure;
   decoding, with processing circuitry, the reassembled data structure based on the offset indicators of the received packets and the fragment size for at least one of the received packets; and
   determining a missing packet in the plurality of packets using real-time transport protocol based on the reassembled data structure.

2. The method according to claim 1, wherein in the receiving, the plurality of packets are received in a packet order and each offset indicator indicates the amount of fragment data encapsulated within preceding packets in the packet order.

3. The method according to claim 1, wherein
   each of the packets of the plurality of packets received in the receiving includes a header, and
   the offset indicator of each packet is located within the header.

4. The method according to claim 1, wherein
   the plurality of packets received in the receiving further includes a plurality of tiles in a tile order, and
   the data structure includes a structure header that includes the tile order and tile offset entry points within the data structure.

5. The method according to claim 4, wherein the decoding includes:
   extracting the offset indicator of a prior packet, $O_p$, and the offset indicator of a next packet, $O_n$, the prior packet and the next packet being packets received in the receiving, the prior packet being a packet immediately before the missing packet in the packet order, and the next packet being a packet immediately after the missing packet in the packet order;

determining a prior packet data size, $D_p$;

determining a missing data size, $D_m$, where $D_m=O_n-(O_p+D_p)$;

identifying whole tiles in the packets received in the receiving; and decoding the identified whole tiles based on the offset indicators of the received packets, the missing data size, $P_m$, and the title entry points of the structure header.

6. The method according to claim 1, wherein each packet of the received packets is a real-time transport protocol (RTP) payload packet, and each header field is an RTP payload packet header.

7. A method of decoding packetized data, the method comprising:

receiving, with processing circuitry, a plurality of packets, each packet of the plurality of packets including a data fragment of a data structure, and each packet of the plurality of packets including an offset indicator that indicates an amount of fragment data encapsulated within preceding packets;

reassembling, with processing circuitry, the data fragments of the received packets into a reassembled data structure; and decoding, with processing circuitry, the reassembled data structure based on the offset indicators of the received packets, wherein the decoding includes:

determining whether a packet was not received, the packet being a missing packet;

extracting the offset indicator of a prior packet, $O_p$, and the offset indicator of a next packet, $O_n$, the prior packet and the next packet being packets received in the receiving, the prior packet being a packet immediately before the missing packet in the packet order, and the next packet being a packet immediately after the missing packet in the packet order;

determining a prior packet data size, $D_p$; and determining a missing data size, $D_m$, where $D_m=O_n-(O_p+D_p)$.

8. A processor, comprising circuitry configured to:

receive a plurality of packets, each packet of the plurality of packets including a data fragment of a data structure, and each packet of the plurality of packets including an offset indicator that indicates quantity of fragment data encapsulated within preceding packets;

reassemble the data fragments of the received packets into a reassembled data structure;

decode the reassembled data structure based on the offset indicators of the received packets;

wherein the circuitry is further configured to receive the plurality of packets in a packet order, wherein each offset indicator indicates the amount of fragment data encapsulated within preceding packets in the packet order; and extract the offset indicator of a first packet, $O_p$, and the offset indicator of a third packet, $O_n$, the first packet and the third packet being packets received in the receiving, the first packet being a packet before a second packet in the packet order, and the third packet being a packet after the second packet in the packet order;

determine a first packet data size, $D_p$; and determine a second data size, $D_m$, where $D_m=O_n-(O_p+D_p)$.

9. The processor according to claim 8, wherein each of the packets of the plurality of packets received by the circuitry includes a header, and the offset indicator of each packet is located within the header.

10. The processor according to claim 8, wherein the plurality of packets received by the circuitry further includes a plurality of tiles in a tile order, and the data structure includes a structure header that includes the tile order and tile offset entry points within the data structure.

11. An apparatus comprising:

a processor, comprising circuitry configured to:

receive a plurality of packets using real-time transport protocol, each packet of the plurality of packets including a data fragment of a data structure, and each packet of the plurality of packets including an offset indicator that indicates a number of bits or bytes of fragment data encapsulated within preceding packets;

determine a fragment size for the data fragment for at least one of the received packets;

extract the offset indicators for the received packets;

reassemble the data fragments of the received packets into a reassembled data structure;

decode the reassembled data structure based on the offset indicators of the received packets and the fragment size for at least one of the received packets; and determine a missing packet in the plurality of packets using real-time transport protocol based on the reassembled data structure.

* * * * *